US010546665B2

(12) United States Patent
Shimomai et al.

(10) Patent No.: US 10,546,665 B2
(45) Date of Patent: Jan. 28, 2020

(54) RESIN COMPOSITION FOR HIGH DIELECTRIC CONSTANT MATERIALS, MOLDED ARTICLE CONTAINING SAME, AND MASTER BATCH FOR COLORING

(71) Applicant: MITSUBISHI GAS CHEMICAL COMPANY, INC., Tokyo (JP)

(72) Inventors: Ken Shimomai, Tokyo (JP); Hirotaka Tsuruya, Chiba (JP); Masahide Sugiyama, Chiba (JP); Yutaka Nishibayashi, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/765,186

(22) PCT Filed: Feb. 6, 2014

(86) PCT No.: PCT/JP2014/052757
§ 371 (c)(1),
(2) Date: Jul. 31, 2015

(87) PCT Pub. No.: WO2014/125992
PCT Pub. Date: Aug. 21, 2014

(65) Prior Publication Data
US 2015/0380125 A1 Dec. 31, 2015

(30) Foreign Application Priority Data

Feb. 15, 2013 (JP) .................. 2013-027334
Jun. 24, 2013 (JP) .................. 2013-131471
Jul. 4, 2013 (JP) .................. 2013-140417
Aug. 9, 2013 (JP) .................. 2013-166963

(51) Int. Cl.
*H01B 3/30* (2006.01)
*B32B 27/36* (2006.01)
*B32B 27/08* (2006.01)

(52) U.S. Cl.
CPC ............ *H01B 3/307* (2013.01); *B32B 27/08* (2013.01); *B32B 27/365* (2013.01); *B32B 2250/02* (2013.01); *B32B 2250/24* (2013.01); *B32B 2264/10* (2013.01); *B32B 2307/204* (2013.01)

(58) Field of Classification Search
CPC ......... B32B 27/36; B32B 27/34; B32B 27/08; B32B 27/302; B32B 27/20; B32B 27/365; B32B 2250/02; B32B 2250/24; B32B 2264/10; B32B 2307/204; B32B 2270/00; B32B 2307/724; B32B 2262/106; B32B 2457/00; C08J 3/226; C08K 3/04; C08L 101/00; H01L 33/307; H01L 33/42; H01L 33/30; H01L 33/44; H01B 3/42; H01B 3/30; H01B 3/44; H01B 3/307
See application file for complete search history.

(56) References Cited

U.S. PATENT DOCUMENTS

| 5,352,745 | A | * | 10/1994 | Katayose | ............ C08F 290/142 428/461 |
| 5,814,697 | A | | 9/1998 | Akao et al. | |
| 6,022,924 | A | | 2/2000 | Akao et al. | |
| 9,688,834 | B2 | * | 6/2017 | Yokota | ...................... C08K 3/04 |
| 2006/0211800 | A1 | | 9/2006 | Itakura et al. | |
| 2010/0078194 | A1 | * | 4/2010 | Bhatt | ...................... B82Y 30/00 174/110 SR |
| 2011/0207846 | A1 | * | 8/2011 | Monden | .................. C08L 69/00 523/134 |
| 2011/0213051 | A1 | * | 9/2011 | Seidel | ...................... C08J 3/226 523/340 |
| 2012/0273253 | A1 | | 11/2012 | Nilsson et al. | |

FOREIGN PATENT DOCUMENTS

| EP | 2 495 285 | 9/2012 |
| JP | 61-236854 | 10/1986 |
| JP | 1-229074 | 9/1989 |
| JP | H08-27305 | 1/1996 |
| JP | 2000-38512 A1 | 2/2000 |
| JP | 2000-160051 A1 | 6/2000 |
| JP | 2001-22033 | 1/2001 |
| JP | 2002-30233 | 1/2002 |
| JP | 2002-72419 | 3/2002 |
| JP | 2004-251048 | 9/2004 |
| JP | 3930814 | 3/2007 |
| JP | 2009-26646 | 2/2009 |
| JP | 2011-116955 | 6/2011 |
| JP | 2011-126953 | 6/2011 |
| JP | 2012-177015 | 9/2012 |
| JP | 2012-214542 | 11/2012 |

(Continued)

OTHER PUBLICATIONS

Extended European Search Report issued in Patent Application No. 14751498.8, dated Aug. 31, 2016.
Shuhei Nakamura et al., "Dielectric Properties of Carbon Black-Polyethylene Composites Below the Percolation Threshold-Discussion based on the symmetrical effective medium approximation theory", Journal A of the Institute of Electrical Engineers of Japan, The Institute of Electrical Engineers of Japan, 1999, pp. 1355-1361, (Heisei 11), vol. 11.
Search Report issued in Patent Application No. PCT/JP2014/052757, dated Apr. 28, 2014.
International Preliminary Report on Patentability issued in Patent Application No. PCT/JP2014/052757, dated Aug. 18, 2015.
Xu Pei Xian, "Plastic Product Design Guide Paperback (First Edition)", Chemical Industry Press; Mar. 1, 2017; pp. 268-269, 272, 276-278 (with English translation of outlined portions of pp. 272, 276, and 277).

(Continued)

*Primary Examiner* — Cheng Yuan Huang
(74) *Attorney, Agent, or Firm* — Greenblum & Bernstein, P.L.C.

(57) ABSTRACT

This resin composition for high dielectric constant materials contains 40-80% by mass of (A) a resin material and 20-60% by mass of (B) a carbon black. The carbon black (B) has a DBP absorption of 10-50 mL/100 g and an iodine adsorption of 5-40 mg/g. This resin composition for high dielectric constant materials has a dielectric constant of 4 or more and a dielectric loss tangent of 0.05 or less.

11 Claims, No Drawings

(56) References Cited

FOREIGN PATENT DOCUMENTS

| WO | 2011/057925 | 5/2011 | | |
|---|---|---|---|---|
| WO | 2012132779 | 10/2012 | | |
| WO | WO-2012132779 A1 * | 10/2012 | ............... | C08K 3/04 |

OTHER PUBLICATIONS

Xu Pei Xian, "Plastic Product Design Guide Paperback (First Edition)", Chemical Industry Press; Mar. 1, 2017; pp. 268-269, 272, 276-278.

* cited by examiner

RESIN COMPOSITION FOR HIGH DIELECTRIC CONSTANT MATERIALS, MOLDED ARTICLE CONTAINING SAME, AND MASTER BATCH FOR COLORING

TECHNICAL FIELD

The present invention relates to a resin composition for high dielectric constant materials suitable for a material required to have a high dielectric constant, a molded article containing the same and a master batch for coloring.

BACKGROUND ART

Background Art 1

Conventionally, as a material for surface mount antennas in which an electrode is placed on the surface thereof, which is used for mobile communication devices such as mobile telephones, etc., a material consisting of a ceramic-containing resin composition has been proposed. For example, a resin composition obtained by mixing a resin material with spherical dielectric ceramic powder at a ratio of 40 vol % to 70 vol % relative to the composition is disclosed (e.g., Patent Document 1).

However, a high dielectric constant is not obtained by a resin composition consisting of ceramic powder and resin unless an amount of ceramic powder to be added is increased, and as a result, the problem of high specific gravity is caused and reduction in weight of antennas cannot be realized thereby. Further, when molding such a resin composition, a molded article obtained is fragile and has a problem of impact resistance. When applied to communication devices typified by mobile telephones, impact resistance sufficient for resisting drop impact is strongly required.

For the purpose of imparting conductivity to a resin material, mixing particles of a carbon material such as graphite and carbon black is generally performed. However, in particular, when the blending amount of carbon black is smaller than the percolation threshold, a higher dielectric constant can be obtained with insulation properties being retained, and frequency dependence of dielectric constant and temperature dependence thereof also have been studied (e.g., Non-patent Document 1).

However, since it is very difficult to knead carbon black into a material, when the amount of carbon black to be added is increased for obtaining a higher dielectric constant, the carbon black is dispersed insufficiently, and this may cause the problems of difficulty in melting of a resin composition and generation of poor outer appearance such as a flow mark on a molded article. Further, when using such a resin composition as a material for antennas, since a metal for transmitting and receiving radio waves is essential, good plating characteristics are required. However, when the amount of carbon black to be added is increased for obtaining a higher dielectric constant, poor dispersion may cause problems that the carbon black rises to the surface of a molded article and the peel strength of a plating film is insufficient.

Meanwhile, several means for improving impact resistance of molded articles of resin compositions are known. One of them is a method for blending an olefin-based copolymer in a resin (e.g., Patent Document 2). However, a general base resin in a resin composition requiring a high dielectric constant is a polyphenylene sulfide (PPS) resin or liquid crystal polymer, and therefore, the effect of improving impact resistance is not sufficiently obtained. Further, though it is desired to employ a polycarbonate resin which has excellent impact resistance as the base resin, a typical high dielectric constant ceramic such as titanium oxide and titanic acid alkaline earth metal salt functions as a catalyst for hydrolyzing a polycarbonate resin, and therefore the polycarbonate resin cannot be employed. This is because the problem of significant reduction in resin viscosity may be caused in a process performed at high temperatures such as extrusion molding.

As another means for improving impact resistance, production of a two-color molded article by compounding a base resin with a resin having high impact resistance is known (e.g., Patent Document 3). However, in the case of a two-color molded article obtained by compounding PPS or a liquid crystal polymer with a polycarbonate resin having high impact resistance, sufficient impact resistance cannot be obtained because of weak interface adhesion. Thus, imparting sufficient impact resistance to a molded article of a resin composition having a high dielectric constant has been tried, but has not been successfully carried out.

Background Art 2

Conventionally, when coloring a thermoplastic resin black, a method in which: a powdery or granular carbon black is blended in powder or pellet of a resin or resin composition or a mixture of such a pellet and powder; and the mixture is melt-kneaded and extruded using an extruder and then cut to produce a pellet, is widely carried out. However, in such a method, when blending carbon black powder directly in a resin or resin composition, there are problems such as work environment contamination due to fine powder, difficulty in handling, and generation of grain of carbon black, color remaining of a successive lot and color mixing due to classification, agglomeration or the like.

In this regard, a method for a coloring a resin with a master batch, which is produced in advance by dispersing a carbon black in a resin at a high concentration, is known. In such a coloring method, a carbon black is not scattered and excellent handling properties are provided. Therefore, currently, such a method is the mainstream of resin coloring.

However, even in the method as described above, carbon black particles are not dispersed sufficiently, and it is difficult to blend a large amount of carbon black. Further, on the surface of a molded article made from a resin composition colored with a master batch, "grain" which is an agglomerate of carbon black particles is observed, and good outer appearance is not obtained (e.g., Patent Document 4).

PRIOR ART DOCUMENTS

Patent Documents

Patent Document 1: Japanese Patent No. 3930814
Patent Document 2: Japanese Laid-Open Patent Publication No. 2012-177015
Patent Document 3: Japanese Laid-Open Patent Publication No. 2009-026646
Patent Document 4: Japanese Laid-Open Patent Publication No. S61-236854

Non-Patent Documents

Non-Patent Document 1: Nakamura, "Interpretation of dielectric characteristics of carbon black-polyethylene complex with percolation threshold or less" (in Japanese), Journal A of the Institute of Electrical Engineers of Japan, The Institute of Electrical Engineers of Japan, 1999 (Heisei 11), Vol. 119, No. 11, pp. 1355-1361

SUMMARY

Technical Problem

One of the problems to be solved by the present invention is to provide a resin composition for high dielectric constant materials having an excellent dielectric constant, dielectric loss tangent, outer appearance, etc. and a molded article containing the same. Another problem to be solved by the present invention is to provide a master batch for coloring which can be easily mass-produced, wherein poor outer appearance is not easily caused in a molded article of colored resin.

Solution to Problem

The present inventors made researches and found that a resin composition having a high dielectric constant and a low dielectric loss tangent can be obtained by blending a specific amount of a specific carbon black in a resin material.

One embodiment of the present invention is a resin composition containing a resin material (A) and a carbon black (B), wherein the carbon black (B) has a specific DBP (dibutyl phthalate) absorption and a specific iodine adsorption. A resin composition suitable for use in high dielectric constant materials, in particular, use in antenna members can be easily obtained thereby.

For example, the present invention is as follows:
[1] A resin composition for high dielectric constant materials, which contains 40 to 80% by mass of a resin material (A) and 20 to 60% by mass of a carbon black (B), wherein the carbon black (B) has a DBP absorption of 10 to 50 mL/100 g and an iodine adsorption of 5 to 40 mg/g, and wherein the resin composition for high dielectric constant materials has a dielectric constant of 4 or more and a dielectric loss tangent of 0.05 or less.
[2] The resin composition for high dielectric constant materials according to item [1], which contains 50 to 60% by mass of the resin material (A) and 40 to 50% by mass of the carbon black (B), wherein the carbon black (B) has a DBP absorption of 25 to 35 mL/100 g and an iodine adsorption of 10 to 30 mg/g.
[3] The resin composition for high dielectric constant materials according to item [1] or [2], wherein the carbon black (B) has a nitrogen adsorption specific surface area of 5 to 40 $m^2/g$.
[4] The resin composition for high dielectric constant materials according to any one of items [1] to [3], wherein the carbon black (B) has a ratio of the nitrogen adsorption specific surface area to the iodine adsorption of less than 1.3.
[5] The resin composition for high dielectric constant materials according to any one of items [1] to [4], wherein the resin material (A) is a polycarbonate resin, a modified polyphenylene ether resin, a polyphenylene sulfide resin or a polycarbonate/ABS alloy.
[6] The resin composition for high dielectric constant materials according to item [5], wherein the resin material (A) is a polycarbonate resin.
[6-1] The resin composition for high dielectric constant materials according to any one of items [1] to [6], wherein the carbon black (B) has a surface pH of 3 to 8.
[7] A molded article containing the resin composition for high dielectric constant materials according to any one of items [1] to [6-1].

Further, the present inventors made researches and found that a resin composition for high dielectric constant materials having a high dielectric constant, a low dielectric loss tangent and thermal stability can be obtained by blending a specific amount of a specific carbon black in a polycarbonate resin, and that a molded article obtained by two-color molding of the resin composition and a polycarbonate resin can solve the above-described problems, and thus the present invention was achieved.

For example, the present invention is as follows:
[8] A molded article obtained by two-color molding of: a resin composition for high dielectric constant materials (C), which contains a polycarbonate resin (a) and a carbon black (b) having a DBP absorption of 10 to 50 mL/100 g and an iodine adsorption of 5 to 40 mg/g, wherein the content of the polycarbonate resin (a) is 40 to 80% by mass and the content of the carbon black (b) is 20 to 60% by mass; and a polycarbonate resin (D).
[8-1] The molded article according to item [8], wherein in the resin composition for high dielectric constant materials (C), the content of the polycarbonate resin (a) is 50 to 60% by mass and the content of the carbon black (b) is 40 to 50% by mass, and wherein the carbon black (b) has a DBP absorption of 25 to 35 mL/100 g and an iodine adsorption of 10 to 30 mg/g.
[8-2] The molded article according to item [8] or [8-1], wherein the resin composition for high dielectric constant materials (C) has a dielectric constant of 4 or more and a dielectric loss tangent of 0.05 or less.
[8-3] A molded article obtained by two-color molding of the resin composition for high dielectric constant materials (C) according to item [6] and a polycarbonate resin (D).
[8-4] The molded article according to any one of items [8] to [8-3], wherein the carbon black (b) has a nitrogen adsorption specific surface area of 5 to 40 $m^2/g$.
[8-5] The molded article according to any one of items [8] to [8-4], wherein the carbon black (b) has a ratio of the nitrogen adsorption specific surface area to the iodine adsorption of less than 1.3.
[8-6] The molded article according to any one of items [8] to [8-5], wherein the polycarbonate resin (a) has a viscosity-average molecular weight of 15,000 to 25,000.
[9] The molded article according to any one of items [8] to [8-6], which consists of a layer of the resin composition for high dielectric constant materials (C) and a layer of the polycarbonate resin (D), wherein the thickness of the layer of the polycarbonate resin (D) is 0.1 to 5 mm.
[10] The molded article according to item [8] or [9], wherein the resin composition for high dielectric constant materials (C) and/or the polycarbonate resin (D) contain an inorganic filler.

Further, the present inventors made researches and found that a master batch for coloring which solves the above-described problems can be obtained by using a carbon black having a specific DBP (dibutyl phthalate) absorption, and thus the present invention was achieved.

For example, the present invention is as follows:
[11] A master batch for coloring, which contains a carbon black (E) and a resin material (F), wherein the carbon black (E) has a DBP absorption of 10 to 50 mL/100 g and an iodine adsorption of 10 to 30 mg/g.
[12] The master batch for coloring according to item [11], wherein the DBP absorption is 25 to 35 mL/100 g.
[13] The master batch for coloring according to item [11] or [12], wherein the content of the carbon black (E) is 10 to 90% by mass and the content of the resin material (F) is 10 to 90% by mass.

[14] The master batch for coloring according to item [13], wherein the content of the carbon black (E) is 40 to 90% by mass and the content of the resin material (F) is 10 to 60% by mass.
[15] The master batch for coloring according to any one of items [11] to [14], wherein the resin material (F) is at least one selected from the group consisting of a polycarbonate resin, a polystyrene-based resin, a polyamide-based resin, a polyester-based resin and a polyacetal-based resin.
[16] The master batch for coloring according to item [15], wherein the resin material is a polycarbonate resin.
[16-1] The master batch for coloring according to any one of items [11] to [16], wherein the carbon black (E) has a surface pH of 3 to 8.
[17] The master batch for coloring according to any one of items [11] to [16-1], further containing a thermal stabilizer.
[18] A molding material containing the master batch for coloring according to any one of items [11] to [17] and a resin to be colored.

Advantageous Effects of Invention

According to the present invention, it is possible to provide a resin composition for high dielectric constant materials having an excellent dielectric constant, dielectric loss tangent, outer appearance, etc. and a molded article containing the same. It is also possible to provide a master batch for coloring which can be easily mass-produced, wherein poor outer appearance is not easily caused in a molded article of colored resin.

DESCRIPTION OF EMBODIMENTS

First Embodiment

The resin composition for high dielectric constant materials in the first embodiment of the present invention contains a resin material (A) and a carbon black (B) having specific physical properties. The carbon black (B) is characterized in that it has a low DBP absorption and a small iodine adsorption.

Resin Material (A)

The resin material as the base material of the resin composition for high dielectric constant materials preferably has a low dielectric loss tangent. The resin may be either a thermoplastic resin or a thermosetting resin, but a thermoplastic resin which can be subjected to injection molding is preferred. Examples thereof include polyolefin-based resins such as a low density polyethylene, a very low density polyethylene, an ultra low density polyethylene, a high density polyethylene, a low molecular weight polyethylene, an ultra high molecular weight polyethylene, an ethylene-propylene copolymer, polypropylene and an acrylonitrile-butadiene-styrene copolymer (ABS resin), modified polyphenylene ether resins such as an alloy of polyphenylene ether resin and polystyrene-based resin, an alloy of polyphenylene ether resin and polyamide-based resin and an alloy of polyphenylene ether resin and polyolefin-based resin, and a polycarbonate resin. In addition, engineering plastics such as polyester resins typified by polybutyrene terephthalate resin, polyethylene terephthalate resin, etc., polyamide resins typified by polyamide 6, polyamide 66, polyamide MXD6, etc., and polyacetal resins, and alloys containing such a resin are also mentioned. If desired, highly heat-resistant super engineering plastics such as liquid crystal polymers, polyphenylene sulfide resins and polyimide resins and alloys containing such a substance can also be used.

Among them, preferred are a polycarbonate resin, modified polyphenylene ether resins, polyphenylene sulfide resins and an alloy of polycarbonate and ABS, and particularly preferred are a polycarbonate resin and modified polyphenylene ether obtained by alloying polyphenylene ether resin with polystyrene-based resin because of excellent molding processability and heat resistance thereof.

Carbon Black (B)

The carbon black to be used in the present invention has a DBP absorption of 10 to 50 mL/100 g and an iodine adsorption of 5 to 40 mg/g, and preferably has a DBP absorption of 25 to 35 mL/100 g and an iodine adsorption of 10 to 30 mg/g. The method for measuring a DBP absorption is described in JIS K6217-4: 2001, and the DBP absorption is represented by the volume of DBP absorbed per 100 g (mL/100 g). Further, the method for measuring an iodine adsorption is described in JIS K6217-1: 2008, and the iodine adsorption is represented by the amount of iodine adsorbed per unit weight of the carbon black (mg/g). Both are commonly used as indexes of characteristics of carbon black.

In general, carbon black exists in a state called "aggregate" in which particles are bonded by fusion, and it is conceptually compared to a bunch of grapes. The degree of development of this aggregate is called "structure", and the DBP absorption is used as an index representing the degree of structure development. The iodine adsorption is the most representative index for the measurement of the total specific surface area of the carbon black particle including pores thereof.

It can be said that the smaller the iodine adsorption is, the smaller the specific surface area of the carbon black particle is, resulting in low possibility of contact between particles in the resin composition. The smaller the DBP absorption is, the lower the degree of structure development is, and it means that combining of particles by fusion bonding is undeveloped. That is, if a large amount of a carbon black having these characteristics is added to resin, particles are easily insulated by the resin. In addition, it is considered that insulation properties are maintained because of a high percolation threshold, which enables imparting dielectric characteristics, specifically, a high dielectric constant and a low dielectric loss tangent to the resin composition.

When the DBP absorption of the carbon black is more than 50 mL/100 g or the iodine adsorption is more than 40 mg/g, the frequency of contact between carbon black particles in the resin composition causing electrical bonding is increased, and the dielectric loss tangent is increased. This simultaneously means that poor dispersion of carbon black particles in the resin composition is easily caused, and therefore, poor dispersion is easily caused at the time of melting and kneading and separated carbon black easily attaches to areas near dies. As a result, it may become difficult to produce pellets stably or it may become difficult to obtain a molded article having excellent outer appearance because of generation of poor outer appearance such as a flow mark on an injection-molded article.

It is easier to obtain a resin composition having a high dielectric constant by using a carbon black whose structure is more developed, but it has problems of dielectric constant anisotropy due to the orientation of aggregate and increase of the dielectric loss tangent due to percolation, and therefore is not suitable, in particular, for antenna members.

In the case of a carbon black having a DBP absorption of less than 10 mL/100 g, adhesion of carbon black particles to a production apparatus is increased at the time of the production of the carbon black, resulting in difficulty in continuous operation (Japanese Laid-Open Patent Publication No. 2011-98995). For this reason, it is difficult to stably obtain the carbon black. Further, no carbon black having an iodine adsorption of less than 5 mg/g is sold domestically and internationally, and it is difficult to stably purchase it.

The type of the carbon black (B) to be used in the present invention is not limited as long as it has a specific DBP absorption and iodine adsorption, and it can be suitably selected depending on purposes. Examples thereof include oil furnace black, which is produced by subjecting raw oil to incomplete combustion according to the oil furnace method, Ketjen black, which is produced according to the special furnace method, acetylene black, which is produced using acetylene gas as a raw material, lamp black, which is produced by direct combustion of a raw material in a closed space, thermal black, which is produced by thermal decomposition of natural gas, and channel black, which is obtained by contacting the bottom surface of a channel steel with diffusion flame. As commercially-available products, "Asahi #8" and "Asahi Thermal" (Asahi Carbon Co., Ltd.) produced according to the furnace black method are mentioned.

Regarding the surface pH of the carbon black, those showing to be moderately alkaline and those showing to be neutral to acidic exist. When using a polycarbonate or polyester as the resin material (A), these resins tend to be hydrolyzed by an alkali. Accordingly, for the carbon black (B), those showing to be neutral to acidic are suitable, and the surface pH is preferably 3 to 8.

In one embodiment, the carbon black (B) has a nitrogen adsorption specific surface area ($N_2SA$) of preferably 5 to 40 $m^2/g$, and more preferably 10 to 30 $m^2/g$. The nitrogen adsorption specific surface area represents the total specific surface area of the carbon black like the iodine adsorption, and is useful as an index of characteristics of the carbon black. The nitrogen adsorption specific surface area can be measured according to JIS K6217-2. Advantages of the above-described range of the nitrogen adsorption specific surface area of the carbon black are similar to those of the iodine adsorption, and it is preferred in terms of the dielectric constant, dielectric loss tangent, etc.

Further, the ratio of the nitrogen adsorption specific surface area to the iodine adsorption ($N_2SA/IA$) is preferably less than 1.3, and more preferably less than 1.1. By adding a carbon black in which $N_2SA/IA$ is within the above-described range in the below-described amount, a resin composition having a more excellent dielectric constant and dielectric loss tangent can be obtained. Such a resin composition can exert stable dielectric performance.

The resin composition for high dielectric constant materials contains 40 to 80% by mass of the resin material (A) and 20 to 60% by mass of the carbon black (B), and preferably contains 50 to 60% by mass of the resin material (A) and 40 to 50% by mass of the carbon black (B). When the carbon black has the above-described specific DBP absorption and iodine adsorption, within the above-described range, percolation of carbon black particles is not caused and a resin composition having a high dielectric constant and a low dielectric loss tangent can be obtained. Note that the characteristics such as the dielectric characteristics and percolation threshold depend on the volume fraction theoretically. When 20 to 60% by mass of the carbon black (B) is contained, it corresponds to about 15 to 55% by volume based on the volume fraction.

It is preferred to blend a thermal stabilizer in the resin composition for high dielectric constant materials in order to improve thermal stability in a high temperature atmosphere at the time of melting and kneading in the production of the resin composition and the molding process and at the time of use of a product. As the thermal stabilizer, a hindered phenol-based compound, a phosphite-based compound, a phosphonate-based compound, zinc oxide, etc. are preferred.

To the resin composition for high dielectric constant materials, other components can be further added according to need. Examples of such additives include a filler, a reinforcing agent, a weather resistance improvement agent, a foaming agent, a lubricant, a flowability improvement agent, an impact resistance improvement agent, a dye, a pigment and a dispersant.

For example, as the filler and the reinforcing agent, both organic substances and inorganic substances can be used, but usually, it is preferred to use inorganic substances such as glass fiber, mica (white mica, black mica, gold mica, etc.), alumina, talc, wollastonite, potassium titanate, calcium carbonate and silica. These substances are blended in an amount of preferably 1 to 100 parts by mass, more preferably 5 to 80 parts by mass, and even more preferably 5 to 60 parts by mass relative to 100 parts by mass of the resin material (A) and the specific carbon black (B) in total. By blending these substances, in general, it is possible to improve rigidity, heat resistance, dimension accuracy, etc. Among them, white mica and alumina have the effect of reducing the dielectric loss tangent, and therefore are particularly preferred. The blending amount of white mica and alumina is preferably 5 to 100 parts by mass, and more preferably 10 to 50 parts by mass relative to 100 parts by mass of the resin material (A) and the specific carbon black (B) in total.

In general, the impact resistance improvement agent is not particularly limited as long as it can be blended in a resin composition to improve the impact resistance thereof, but specific examples thereof include styrene-butadiene-based block polymers such as SBS (styrene-butadiene-styrene) and SEBS (styrene-ethylene-butylene-styrene) and hydrogenated products thereof, styrene-isoprene-based block polymers such as SIS (styrene-isoprene-styrene) and SEPS (styrene-ethylene-propylene-styrene) and hydrogenated products thereof, multilayer-structured polymers including an olefin-based elastomer, a polyester-based elastomer, a silicone-based rubber, an acrylate-based rubber and an alkyl (meth)acrylate-based polymer, and composite rubber-based graft copolymers obtained by graft-polymerizing a vinyl-based monomer onto a composite rubber consisting of a silicone-based rubber and an acrylate-based rubber component. The blending amount thereof is preferably 3 to 20 parts by mass, and more preferably 5 to 10 parts by mass relative to 100 parts by mass of the resin material (A) and the specific carbon black (B) in total.

The resin composition for high dielectric constant materials of the present invention contains the resin material (A) and the specific carbon black (B), and it is produced, for example, by undergoing a process of melting and kneading the resin material (A) and the specific carbon black (B). It is also possible to obtain the composition by a method of removing a solvent from a varnish homogeneously dispersed in the solvent in which the resin material is dissolved.

The carbon black (B) to be used in the present application has a DBP absorption of 10 to 50 mL/100 g and an iodine adsorption of 5 to 40 mg/g, and shows better dispersibility in melted resin compared to usual carbon blacks having a DBP absorption and iodine adsorption exceeding the upper limits of the above-described numerical ranges. Therefore, the resin composition for high dielectric constant materials of the present invention is suitable for the production by melting and kneading using an extruder.

Melting and kneading can be carried out, for example, by blending the carbon black (B), and according to need, the thermal stabilizer or additives as described above in the resin material (A), homogeneously mixing them using a Henschel mixer, a ribbon blender, a V-type blender or the like, and then heating and kneading the mixture in a melt state using a single-screw or multi-screw kneading extruder, a roll, a Banbury mixer, a Labo Plastomill (Brabender) or the like. Instead of mixing and kneading all components at a time, several components can be mixed in advance or supplied in the middle of kneading without mixing in advance.

The kneading temperature and the kneading time vary depending on the type of the desired resin composition for high dielectric constant materials, the type of the kneading machine, etc., but usually, the kneading temperature is 200 to 350° C., and preferably 220 to 320° C., and the kneading time is preferably 20 minutes or less. When the temperature is higher than 350° C. or the time is more than 20 minutes, heat deterioration of the resin material is caused, and it may result in reduction in physical properties of a molded article or poor outer appearance of the article. The pellet of the resin composition for high dielectric constant materials obtained in this way can be formed into a molded article using a molding method generally used for thermoplastic resins, for example, the injection molding method, extrusion molding method, hollow molding method, thermoforming method, press molding method or the like. Among them, the injection molding method is preferred in terms of the productivity and product performance.

The resin composition for high dielectric constant materials of the present invention can be easily produced. Further, there is no flow mark or the like on the injection-molded article and good outer appearance is provided. Therefore, it is suitable for antenna members. For miniaturizing the antenna members, the dielectric constant of the resin composition is preferably 4 or more, more preferably 6 or more, even more preferably 8 or more, and particularly preferably 9 or more. This is because the size of the antenna members cannot be sufficiently reduced when the dielectric constant is small. The upper limit of the dielectric constant is not particularly limited from the viewpoint of miniaturization, but when the dielectric constant is too large, the size of antennas becomes too small. Therefore, for practical purposes, the dielectric constant is preferably 30 or less, more preferably 14 or less, even more preferably 12 or less, and particularly preferably 11 or less. The smaller the dielectric loss tangent is, the higher the efficiency of emitting radio waves from the antenna is, and the battery lasts for a long time. Therefore, the dielectric loss tangent is preferably 0.05 or less, more preferably 0.03 or less, and particularly preferably 0.01 or less.

When producing an antenna member using a molded article made by using a resin composition, an antenna pattern of a conductor is formed on the surface of the molded article. In this regard, when using the above-described resin composition for high dielectric constant materials, a pattern can be easily formed, for example, by the electroless copper plating treatment for standard ABS. The electroless copper plating treatment usually consists of the pretreatment step, the chemical etching step, the catalyst addition step, the activation step and the chemical plating step, and the formation of fine concavo-convex shape due to surface roughening in the chemical etching step significantly affects the adhesion between a plated metal and a resin. The above-described carbon black having a specific DBP absorption has good dispersibility in resin. Therefore, even if the blending amount of the carbon black is large, it does not bleed out, and even if surface roughening is caused, carbon black particles are not easily released on the surface of the molded article. Accordingly, good adhesion of electroless copper plating to the resin composition is provided.

Example A

The above-described first embodiment will be described in more detail based on working examples, but the present invention is not limited thereto. The below-described materials were used as the respective components in the working examples.

(A) Resin Material
(a1) Polycarbonate Resin
Manufactured by Mitsubishi Engineering-Plastics Corporation, "trade name: S-3000FN"
(a2) Polyphenylene Ether Resin
Poly(2,6-dimethyl-1,4-phenylene)ether (hereinafter abbreviated as "PPE"); manufactured by Mitsubishi Engineering-Plastics Corporation, "trade name: PX100L", limiting viscosity at 30° C. measured in chloroform: 0.47 dl/g
(a3) High Impact Polystyrene Resin (Hereinafter Abbreviated as "HIPS")
Manufactured by Japan Polystyrene Inc., "trade name: HT478", weight average molecular weight: 200,000, MFR: 3.0 g/10 min (measured under the condition of 200° C.×5 kg)

(B) Carbon Black
(b1) Manufactured by Asahi Carbon Co., Ltd., "trade name: Asahi #8"
(b2) Manufactured by Asahi Carbon Co., Ltd., "trade name: Asahi Thermal"
(b3) Manufactured by Asahi Carbon Co., Ltd., "trade name: Asahi #15"
(b4) Manufactured by Asahi Carbon Co., Ltd., "trade name: Asahi #35"
(b5) Manufactured by Tokai Carbon Co., Ltd., "trade name: Seast TA"
(b6) Manufactured by Tokai Carbon Co., Ltd., "trade name: Seast S"
(b7) Manufactured by Tokai Carbon Co., Ltd., "trade name: TOKABLACK #7270SB"
(b8) Manufactured by Tokai Carbon Co., Ltd., "trade name: TOKABLACK #7100F"

Physical properties of the carbon blacks used are described in Table A below.

TABLE A

| | DBP absorption (mL/100 g) | Iodine adsorption (IA) (mg/g) | Nitrogen adsorption specific surface area ($N_2SA$) ($m^2/g$) | $N_2SA$/IA | pH |
|---|---|---|---|---|---|
| (b1) Asahi #8 | 30 | 12 | 12 | 1.00 | 7.5 |
| (b2) Asahi Thermal | 28 | 27 | 24 | 0.89 | 8.0 |
| (b3) Asahi #15 | 41 | 11 | 12 | 1.09 | 6.0 |
| (b4) Asahi #35 | 50 | 23 | 24 | 1.04 | 8.0 |
| (b5) Seast TA | 42 | 18 | 19 | 1.06 | 7.0 |
| (b6) Seast S | 68 | 26 | 27 | 1.04 | 7.0 |
| (b7) TOKABLACK #7270SB | 62 | 62 | 58 | 0.94 | 7.5 |

TABLE A-continued

|  | DBP absorption (mL/100 g) | Iodine adsorption (IA) (mg/g) | Nitrogen adsorption specific surface area ($N_2SA$) ($m^2/g$) | $N_2SA$/IA | pH |
|---|---|---|---|---|---|
| (b8) TOKABLACK #7100F | 110 | 52 | 49 | 0.94 | 7.0 |

(C) Thermal Stabilizer
(c1) Tetrakis(2,4-di-t-butylphenyl)[1,1-biphenyl]-4,4'-diyl-bisphosphonite, manufactured by Ciba Specialty Chemicals Inc., "trade name: IRGAFAS P-EPQ"
(c2) Tris(2,4-di-t-butylphenyl)phosphite, manufactured by Adeka Argus Co., Ltd., "trade name: ADEKA STAB 2112"

Examples A1 to A10 and Comparative Examples A1 to A7

The polycarbonate resin, polyphenylene ether resin, polystyrene-based resin, carbon black and thermal stabilizer were blended together at the ratio described in Tables 1 and 2, and the mixture was mixed homogeneously using a tumbler mixer. This was put into the upstream part of a twin screw extruder (manufactured by The Japan Steel Works, Ltd., "TEX30α", screw diameter: 30 mm, L/D=63) and melt-kneaded at a cylinder temperature of 265° C. and at a screw rotation speed of 400 rpm, thereby producing a pellet of the resin composition. The obtained pellet was dried at 100° C. for 4 hours, and then the below-described evaluations (1) and (2) were carried out. The evaluation results are shown in Tables 1 and 2.
(Evaluation Methods)
(1) Dielectric Characteristics
Using the pellet of the resin composition obtained by the above-described method, a plate-shaped molded article (100 mm×100 mm×thickness: 3 mm) was produced with an injection molding machine (manufactured by Toshiba Machine Co., Ltd., IS100F, mold clamping force: 100 t) at a cylinder temperature of 290 to 310° C. and at a mold temperature of 100° C., and the dielectric constant and dielectric loss tangent thereof were measured at room temperature and at 1 GHz using a material analyzer (manufactured by Agilent Co., Ltd., 4291A).
The dielectric characteristics of the polycarbonate alone and the modified polyphenylene ether alone, which do not contain carbon black, are shown in Table 2 as Reference Examples A1 and A2.

(2) Outer Appearance
Using the pellet of the resin composition obtained by the above-described method, a plate-shaped molded article (100 mm×100 mm×thickness: 3 mm) was produced with an injection molding machine (manufactured by Toshiba Machine Co., Ltd., IS100F, mold clamping force: 100 t) at a cylinder temperature of 290 to 310° C. and at a mold temperature of 100° C. Evaluation of outer appearance regarding a flow mark generated on the obtained molded article was carried out by visual observation. The outer appearance was evaluated by visual observation on a scale of 1 to 5 (5: very good, 4: good, 3: slightly good, 2: slightly poor, 1: poor).
(3) Plating Characteristics
Using the plate-shaped molded articles used in the evaluation of outer appearance in Example A4 and Comparative Example A4, plated bodies on which a copper coating film having a thickness of 2 μm was formed were prepared by the pretreatment step, the chemical etching step, the catalyst addition step, the activation step and the chemical plating step under conditions for electroless copper plating for standard ABS. Evaluation of the adhesion of the plated coating film was carried out according to JIS-H8504-15 (peeling test). In the aforementioned plated bodies, cuts were made in the plated coating film in the longitudinal and lateral directions at 2-mm intervals to reach the plated bodies, thereby forming 25 squares in a grid-like pattern. After that, a cellophane tape CT-18 manufactured by Nichiban Co., Ltd., which satisfies the provision of JIS Z1522, was attached to the squares in the grid-like pattern and then vigorously peeled off therefrom. By counting the number of the squares remaining on the surface of the plated coating film, the remaining ratio of coating film after peeling the tape was evaluated.
In the case of the plate-shaped molded article used in Example A4, the plated film was not peeled off, and the remaining ratio of coating film was 100%. Meanwhile, in the case of the molded article used in Comparative Example A4, the remaining ratio of coating film was 0%. Further, in the case of the molded article used in Comparative Example A4, the carbon black adhered to the plated coating film peeled off. It is considered that the carbon black was eccentrically located on the surface of the molded article because the resin composition of Comparative Example A4 contained #7100F which has a large DBP absorption (110 mL/100 g).

TABLE 1

|  |  |  | Example A1 | Example A2 | Example A3 | Example A4 | Example A5 | Example A6 | Example A7 | Example A8 | Example A9 | Example A10 |
|---|---|---|---|---|---|---|---|---|---|---|---|---|
| Base resin | PC | a1 |  |  |  |  | 60 | 60 | 60 | 60 | 60 | 40 |
|  | PPE | a2 | 32 | 28 | 24 | 24 |  |  |  |  |  |  |
|  | HIPS | a3 | 48 | 42 | 36 | 36 |  |  |  |  |  |  |
| Carbon black | #8 | b1 |  |  |  | 40 |  | 40 |  |  |  | 60 |
|  | Asahi Thermal | b2 | 20 | 30 | 40 |  | 40 |  |  |  |  |  |
|  | #15 | b3 |  |  |  |  |  |  | 40 |  |  |  |
|  | #35 | b4 |  |  |  |  |  |  |  | 40 |  |  |
|  | Seast TA | b5 |  |  |  |  |  |  |  |  | 40 |  |
| Stabilizer | P-EPQ | c1 | 0.5 | 0.5 | 0.5 | 0.5 |  |  |  |  |  |  |
|  | ADEKA STAB 2112 | c2 |  |  |  |  | 0.05 | 0.05 | 0.05 | 0.05 | 0.05 | 0.05 |

TABLE 1-continued

|  | Example A1 | Example A2 | Example A3 | Example A4 | Example A5 | Example A6 | Example A7 | Example A8 | Example A9 | Example A10 |
|---|---|---|---|---|---|---|---|---|---|---|
| Possibility of melting and kneading | Possible | Possible | Possible | Possible | Possible | Possible | Possible | Possible | Possible | Possible |
| Evaluation of outer appearance | 5 | 5 | 5 | 5 | 5 | 5 | 5 | 5 | 5 | 5 |
| Dielectric constant | 4.1 | 5.6 | 8 | 7.6 | 9.5 | 9.4 | 10.8 | 12.6 | 12.0 | 25 |
| Dielectric loss tangent | 0.0026 | 0.0056 | 0.0118 | 0.0022 | 0.0128 | 0.0081 | 0.012 | 0.034 | 0.028 | 0.045 |

TABLE 2

| | | | Comparative Example A1 | Comparative Example A2 | Comparative Example A3 | Comparative Example A4 | Comparative Example A5 | Comparative Example A6 | Comparative Example A7 | Reference Example A1 | Reference Example A2 |
|---|---|---|---|---|---|---|---|---|---|---|---|
| Base resin | PC | a1 | | | | | | 60 | 60 | 100 | |
| | PPE | a2 | 36 | 36 | 32 | 28 | 24 | | | | 40 |
| | HIPS | a3 | 54 | 54 | 48 | 42 | 36 | | | | 60 |
| Carbon black | Asahi Thermal | b2 | 10 | | | | | | | | |
| | Seast S | b6 | | | | | | 40 | | | |
| | #7270SB | b7 | | | | | | | 40 | | |
| | #7100F | b8 | | 10 | 20 | 30 | 40 | | | | |
| Stabilizer | P-EPQ | c1 | 0.5 | 0.5 | 0.5 | 0.5 | 0.5 | | | | 0.5 |
| | ADEKA STAB 2112 | c2 | | | | | | 0.05 | 0.05 | 0.05 | |
| Possibility of melting and kneading | | | Possible | Possible | Possible | Possible | Impossible | Possible | Possible | Possible | Possible |
| Evaluation of outer appearance | | | 5 | 5 | 4 | 3 | — | 3 | 3 | 5 | 5 |
| Dielectric constant | | | 3.2 | 4.2 | 8.1 | 24.9 | — | 16.6 | 15.6 | 2.8 | 2.6 |
| Dielectric loss tangent | | | 0.0014 | 0.0075 | 0.054 | 0.37 | — | 0.071 | 0.066 | 0.0041 | 0.0008 |

According to the tables, it is understood that the molded articles of resins for high dielectric constant materials of Examples A1 to A10 not only have excellent dielectric characteristics, but also can be easily produced and have excellent outer appearance. Meanwhile, it is understood that the molded articles of Comparative Examples A2 to A7 containing a carbon black, which is not defined by the present invention, have inferior dielectric characteristics, and in particular, have an increased dielectric loss tangent. Moreover, the molded articles have poor outer appearance. Furthermore, it is also understood that even if the carbon black defined by the present invention is used, when the content thereof is small, the dielectric constant is not sufficiently improved.

The resin composition of the above-described first embodiment has excellent dielectric characteristics and is particularly suitable as a high dielectric constant material to be used in an antenna member requiring a high dielectric constant and a low dielectric loss tangent. Moreover, the resin composition has excellent mechanical strength, can be easily mass-produced, and provides good outer appearance of molded articles and good plate adhesion. Since the specific gravity of the carbon black is smaller than ceramic powder, miniaturization and reduction in weight of antennas can be realized. Accordingly, the resin composition of the above-described first embodiment is suitable for a material for antenna members of mobile telephones, etc.

Second Embodiment

The molded article of the second embodiment of the present invention is a two-color molded article made of: a resin composition for high dielectric constant materials (C) containing a polycarbonate resin (a) and a carbon black (b) characterized in that it has a low DBP absorption and a small iodine adsorption; and a polycarbonate resin (D).

(1) Polycarbonate Resin

The molded article of the present invention includes the polycarbonate resin (a), which is the base resin of the resin composition for high dielectric constant materials (C), and the polycarbonate resin (D), which is to be compounded at the time of two-color molding. Both the polycarbonate resins are not particularly limited, and publicly-known polycarbonate resins can be employed. Examples of publicly-known polycarbonate resins include thermoplastic aromatic polycarbonate resins, aliphatic polycarbonate resins and aromatic-aliphatic polycarbonate resins, and among them, aromatic polycarbonate resins are preferred. The aromatic polycarbonate resins are generally obtained by reacting an aromatic dihydroxy compound with phosgene or a diester of carbonic acid.

Examples of the aromatic dihydroxy compound include 2,2-bis(4-hydroxyphenyl)propane (bisphenol A), tetramethylbisphenol A, bis(4-hydroxyphenyl)-P-diisopropylbenzene, hydroquinone, resorcinol and 4,4-dihydroxybiphenyl, and bisphenol A is preferred. In addition, for the purpose of further improving flame retardant properties, it is possible to use a compound in which at least one tetraalkylphosphonium sulfonate is bound to the above-described aromatic dihydroxy compound, and a polymer or oligomer having a siloxane structure and containing phenolic OH groups at both the ends.

Preferred examples of the aromatic polycarbonate resins to be used in the present invention include a polycarbonate resin induced from 2,2-bis(4-hydroxyphenyl)propane and a polycarbonate copolymer induced from 2,2-bis(4-hydroxyphenyl)propane and another aromatic dihydroxy compound. Moreover, two or more types of polycarbonate resins may be used in combination.

The resin composition for high dielectric constant materials (C) contains a large amount (20 to 60% by mass) of carbon black, while thin-wall moldability is desired. Accordingly, the polycarbonate resin (a) as the base resin is preferably a polycarbonate resin having a relatively low viscosity. Specifically, the viscosity-average molecular weight thereof, which is obtained by conversion from the solution viscosity measured at 25° C. using methylene chloride as a solvent, is preferably 15,000 to 25,000. The polycarbonate resin (D), which is to be compounded with the resin composition for high dielectric constant materials (C), is not particularly limited as long as it has a molecular weight which allows to exhibit original impact resistance of the polycarbonate resin, but the above-described viscosity-average molecular weight is preferably 20,000 to 30,000. Use of a polycarbonate having a viscosity-average molecular weight within the above-described range is preferred from the viewpoint of mechanical strength and moldability.

(2) Carbon Black (b)

The carbon black to be used in the present invention has a DBP absorption of 10 to 50 mL/100 g and an iodine adsorption of 5 to 40 mg/g, and preferably has a DBP absorption of 25 to 35 mL/100 g and an iodine adsorption of 10 to 30 mg/g. The method for measuring a DBP absorption is described in JIS K6217-4: 2001, and the DBP absorption is represented by the volume of DBP absorbed per 100 g (mL/100 g). Further, the method for measuring an iodine adsorption is described in JIS K6217-1: 2008, and the iodine adsorption is represented by the amount of iodine adsorbed per unit weight of the carbon black (mg/g). Both are commonly used as indexes of characteristics of carbon black.

In general, carbon black exists in a state called "aggregate" in which particles are bonded by fusion, and it is conceptually compared to a bunch of grapes. The degree of development of this aggregate is called "structure", and the DBP absorption is used as an index representing the degree of structure development. The iodine adsorption is the most representative index for the measurement of the total specific surface area of the carbon black particle including pores thereof.

It can be said that the smaller the iodine adsorption is, the smaller the specific surface area of the carbon black particle is, resulting in low possibility of contact between particles in the resin composition. The smaller the DBP absorption is, the lower the degree of structure development is, and it means that combining of particles by fusion bonding is undeveloped. That is, if a large amount of a carbon black having these characteristics is added to resin, particles are easily insulated by the resin. In addition, it is considered that insulation properties are maintained because of a high percolation threshold, which enables imparting dielectric characteristics, specifically, a high dielectric constant and a low dielectric loss tangent to the resin composition.

When the DBP absorption of the carbon black is more than 50 mL/100 g or the iodine adsorption is more than 40 mg/g, the frequency of contact between carbon black particles in the resin composition causing electrical bonding is increased, and the dielectric loss tangent is increased. This simultaneously means that poor dispersion of carbon black particles in the resin composition is easily caused, and therefore, poor dispersion is easily caused at the time of melting and kneading and separated carbon black easily attaches to areas near dies. As a result, it may become difficult to produce pellets stably or it may become difficult to obtain a molded article having excellent outer appearance because of generation of poor outer appearance such as a flow mark on an injection-molded article.

It is easier to obtain a resin composition having a high dielectric constant by using a carbon black whose structure is more developed, but it has problems of dielectric constant anisotropy due to the orientation of aggregate and increase of the dielectric loss tangent due to percolation, and therefore is not suitable, in particular, for antenna members.

In the case of a carbon black having a DBP absorption of less than 10 mL/100 g, adhesion of carbon black particles to a production apparatus is increased at the time of the production of the carbon black, resulting in difficulty in continuous operation (Japanese Laid-Open Patent Publication No. 2011-98995). For this reason, it is difficult to stably obtain the carbon black. Further, no carbon black having an iodine adsorption of less than 5 mg/g is sold domestically and internationally, and it is difficult to stably purchase it.

The type of the carbon black (b) to be used in the present invention is not limited as long as it has a specific DBP absorption and iodine adsorption, and it can be suitably selected depending on purposes. Examples thereof include oil furnace black, which is produced by subjecting raw oil to incomplete combustion according to the oil furnace method, Ketjen black, which is produced according to the special furnace method, acetylene black, which is produced using acetylene gas as a raw material, lamp black, which is produced by direct combustion of a raw material in a closed space, thermal black, which is produced by thermal decomposition of natural gas, and channel black, which is obtained by contacting the bottom surface of a channel steel with diffusion flame. As commercially-available products, "Asahi #8" and "Asahi Thermal" (Asahi Carbon Co., Ltd.) produced according to the furnace black method are mentioned.

In one embodiment, the carbon black (b) has a nitrogen adsorption specific surface area ($N_2SA$) of preferably 5 to 40 $m^2/g$, and more preferably 10 to 30 $m^2/g$. The nitrogen adsorption specific surface area represents the total specific surface area of the carbon black like the iodine adsorption, and is useful as an index of characteristics of the carbon black. The nitrogen adsorption specific surface area can be measured according to JIS K6217-2. Advantages of the above-described range of the nitrogen adsorption specific surface area of the carbon black are similar to those of the iodine adsorption, and it is preferred in terms of the dielectric constant, dielectric loss tangent, etc.

Further, the ratio of the nitrogen adsorption specific surface area to the iodine adsorption ($N_2SA/IA$) is preferably less than 1.3, and more preferably less than 1.1. By adding a carbon black in which $N_2SA/IA$ is within the above-described range in the below-described amount, a resin composition having a more excellent dielectric constant and dielectric loss tangent can be obtained. Such a resin composition can exert stable dielectric performance.

The resin composition for high dielectric constant materials (C), which constitutes the molded article of the present invention, contains 40 to 80% by mass of the polycarbonate resin (a) and 20 to 60% by mass of the carbon black (b), and preferably contains 50 to 60% by mass of the polycarbonate resin (a) and 40 to 50% by mass of the carbon black (b). When the carbon black has the above-described specific DBP absorption and iodine adsorption, within the above-described range, percolation of carbon black particles is not caused and a resin composition having a high dielectric constant and a low dielectric loss tangent can be obtained. Note that the characteristics such as the dielectric characteristics and percolation threshold depend on the volume fraction theoretically. When 20 to 60% by mass of the carbon black (b) is contained, it corresponds to about 15 to 55% by volume based on the volume fraction.

It is preferred to blend a thermal stabilizer in the resin composition for high dielectric constant materials (C), which constitutes the molded article of the present invention, in order to improve thermal stability in a high temperature atmosphere at the time of melting and kneading in the production of the resin composition and the molding process and at the time of use of a product. As the thermal stabilizer, a hindered phenol-based compound, a phosphite-based compound, a phosphonate-based compound, zinc oxide, etc. are preferred.

To the resin composition for high dielectric constant materials (C), which constitutes the molded article of the present invention, other components can be further added according to need. Examples of such additives include a filler, a reinforcing agent, a weather resistance improvement agent, a foaming agent, a lubricant, a flowability improvement agent, an impact resistance improvement agent, a dye, a pigment and a dispersant. For example, as the filler and the reinforcing agent, both organic substances and inorganic substances can be used, but usually, it is preferred to use inorganic substances such as glass fiber, mica (white mica, black mica, gold mica, etc.), alumina, talc, wollastonite, calcium carbonate and silica. These substances are blended in an amount of preferably 1 to 100 parts by mass, more preferably 5 to 80 parts by mass, and even more preferably 5 to 60 parts by mass relative to 100 parts by mass of the polycarbonate resin (a) and the specific carbon black (b) in total. By blending these substances, in general, it is possible to improve rigidity, heat resistance, dimension accuracy, etc. Among them, white mica and alumina have the effect of reducing the dielectric loss tangent, and therefore are particularly preferred. The blending amount of white mica and alumina is preferably 5 to 100 parts by mass, and more preferably 10 to 50 parts by mass.

The polycarbonate resin (D), which is to be compounded with the resin composition for high dielectric constant materials (C), may contain an elastomer as an impact resistance improvement agent for the purpose of improving the impact strength. The elastomer is not particularly limited, but is preferably a multilayer-structured polymer. Examples of the multilayer-structured polymer include those including an alkyl (meth)acrylate-based polymer. These multilayer-structured polymers are produced, for example, by performing serial multi-step seed polymerization so that a polymer of the preceding step is serially coated with a polymer of the following step. As a basic polymer structure, a polymer has an inner nuclear layer made of a cross-linking component having a low glass transition temperature and the outermost nuclear layer made of a high-molecular compound which improves adhesion to a matrix of a composition. As a component for forming the innermost nuclear layer of the multilayer-structured polymer, a rubber component having a glass transition temperature of 0° C. or lower is selected. Examples of the rubber component include a rubber component of butadiene, etc., a rubber component of styrene/butadiene, etc., a rubber component of an alkyl (meth)acrylate-based polymer, a rubber component in which a polyorganosiloxane-based polymer is intertangled with an alkyl (meth)acrylate-based polymer, and a rubber component in which the aforementioned components are used in combination. Further, examples of the component forming the outermost nuclear layer include an aromatic vinyl monomer, a non-aromatic monomer and a copolymer of two or more types of the aforementioned monomers. Examples of the aromatic vinyl monomer include styrene, vinyl toluene, α-methyl styrene, monochlorstyrene, dichlorstyrene and bromostyrene. Among them, styrene is particularly preferably used. Examples of the non-aromatic monomer include alkyl (meth)acrylate such as ethyl (meth)acrylate and butyl (meth)acrylate, vinyl cyanide such as acrylonitrile and methacrylonitrile and vinylidene cyanide.

Since the resin composition for high dielectric constant materials (C) contains a large amount of the carbon black, a warpage may be generated in the two-color molded article due to the difference in the shrinkage ratio relative to the material to be compounded with the resin composition. For the purpose of decreasing the difference in the shrinkage ratio, an inorganic filler may be blended in the polycarbonate resin (D) which is compounded with the resin composition.

The resin composition for high dielectric constant materials (C), which constitutes the molded article of the present invention, contains the polycarbonate resin (a) and the specific carbon black (b), and it is produced, for example, by undergoing a process of melting and kneading the polycarbonate resin (a) and the specific carbon black (b). It is also possible to obtain the composition by a method of removing a solvent from a varnish homogeneously dispersed in the solvent in which the polycarbonate resin (a) is dissolved.

The carbon black (b) to be used in the present invention has a DBP absorption of 10 to 50 mL/100 g and an iodine adsorption of 5 to 40 mg/g, and shows better dispersibility in melted resin compared to usual carbon blacks having a DBP absorption and iodine adsorption exceeding the upper limits of the above-described numerical ranges. Therefore, it is suitable for the production by melting and kneading using an extruder. The carbon black does not have the function as a hydrolysis catalyst for the polycarbonate resin. Therefore, the polycarbonate resin is not decomposed even at high temperatures at the time of melting, and good thermal stability is provided.

Melting and kneading can be carried out, for example, by blending the carbon black (b), and according to need, the thermal stabilizer or additives as described above in the polycarbonate resin (a), homogeneously mixing them using a Henschel mixer, a ribbon blender, a V-type blender or the like, and then heating and kneading the mixture in a melt state using a single-screw or multi-screw kneading extruder, a roll, a Banbury mixer, a Labo Plastomill (Brabender) or the like. Instead of mixing and kneading all components at a time, several components can be mixed in advance or supplied in the middle of kneading without mixing in advance.

The kneading temperature and the kneading time vary depending on the type of the desired resin composition for high dielectric constant materials (C), the type of the kneading machine, etc., but usually, the kneading temperature is 200 to 350° C., and preferably 220 to 320° C., and the kneading time is preferably 20 minutes or less. When the temperature is higher than 350° C. or the time is more than 20 minutes, heat deterioration of the resin material is caused, and it may result in reduction in physical properties of a molded article or poor outer appearance of the article. The pellet of the resin composition for high dielectric constant materials (C) is obtained in this way.

The molded article of the present invention is obtained by two-color molding of the resin composition for high dielectric constant materials (C) and the polycarbonate resin (D). In two-color molding, on the surface layer of a molded article of a primary material consisting of one of the resin composition for high dielectric constant materials (C) and the polycarbonate resin (D), a secondary material consisting of the other material is injection-molded. For example, using a mold with a cavity having a length of 100 mm, a width of 100 mm and a thickness of 1.5 mmt, the resin composition for high dielectric constant materials (C) as the primary material is injection-molded. Further, using a mold with a cavity having a length of 100 mm, a width of 100 mm and a thickness of 3 mmt, the molded body obtained by the above-described method is inserted into the mold, and then the polycarbonate resin (D) as the secondary material is injection-molded. It is also possible to use the polycarbonate resin (D) as the primary material and the resin composition for high dielectric constant materials (C) as the secondary material. As the primary material, a product obtained by extrusion molding or a product obtained by further thermoforming the extrusion-molded product to be shaped may also be used. Molding conditions thereof are not particularly limited as long as the resin is not deteriorated.

The two-color molded article is a laminated body comprising a layer of the resin composition for high dielectric constant materials (C) and a layer of the polycarbonate resin (D). The layer of the polycarbonate resin (D) has a role to provide impact resistance, and therefore preferably has a thickness of 0.1 mm or more in the molded article. Further, when the thickness is too much, the Charpy impact value may be reduced. Accordingly, the thickness of the layer is preferably 0.1 to 5 mm.

The molded article of the present invention can be easily produced. Further, there is no flow mark or the like on the injection-molded article and good outer appearance is provided. Therefore, it is suitable for antenna members. The antenna circuit is formed on the side of the resin composition for high dielectric constant materials (C) of the two-color molded article. The dielectric characteristics required for the resin material to be applied to the antenna are required only at the portion near the antenna circuit. Therefore, even when the layer of the polycarbonate resin (D), which does not have a high dielectric constant, is located on the opposite side of the layer of the resin composition for high dielectric constant materials (C), antenna performance is not affected thereby.

For miniaturizing the antenna members, the dielectric constant of the resin composition for high dielectric constant materials (C) is preferably 4 or more, more preferably 6 or more, even more preferably 8 or more, and particularly preferably 9 or more. This is because the size of the antenna members cannot be sufficiently reduced when the dielectric constant is small. The upper limit of the dielectric constant is not particularly limited from the viewpoint of miniaturization, but when the dielectric constant is too large, the size of antennas becomes too small. Therefore, for practical purposes, the dielectric constant is preferably 30 or less, more preferably 14 or less, even more preferably 12 or less, and particularly preferably 11 or less. The smaller the dielectric loss tangent is, the higher the efficiency of emitting radio waves from the antenna is, and the battery lasts for a long time. Therefore, the dielectric loss tangent is preferably 0.05 or less, more preferably 0.03 or less, and particularly preferably 0.01 or less.

Example B

The above-described second embodiment will be described in more detail based on working examples, but the present invention is not limited thereto. The below-described materials were used as the respective components in the working examples.

Polycarbonate Resin

Manufactured by Mitsubishi Engineering-Plastics Corporation, "trade name: S-3000FN, viscosity-average molecular weight: 22,000"

Carbon Black

Manufactured by Asahi Carbon Co., Ltd., "trade name: Asahi #8", DBP absorption: 30 mL/100 g, iodine adsorption (AI): 12 mg/g, nitrogen adsorption specific surface area ($N_2SA$): 12 $m^2/g$, $N_2SA/AI$: 1.0

Thermal Stabilizer

Tris(2,4-di-t-butylphenyl)phosphite, manufactured by Adeka Argus Co., Ltd., "trade name: ADEKA STAB 2112"

[Production of the Resin Composition for High Dielectric Constant Materials (C)]

6 kg of a polycarbonate resin (S-3000FN), 4 kg of a carbon black (Asahi #8) and 3 g of a thermal stabilizer (ADEKA STAB 2112) were blended together, and the mixture was mixed homogeneously using a tumbler mixer. This was put into the upstream part of a twin screw extruder (manufactured by The Japan Steel Works, Ltd., "TEX30α", screw diameter: 30 mm, L/D=63) and melt-kneaded at a cylinder temperature of 265° C. and at a screw rotation speed of 400 rpm, thereby producing a pellet of the resin composition for high dielectric constant materials (C). At an opening for supplying the raw material, the material was stable without bridging, etc., and the operation conditions were also stable without variation of the resin pressure. The extruded resin strand was successfully pelletized by utilizing a general water-cooling tank without use of a special equipment such as a mesh belt. Using the obtained pellet, the below-described evaluation was carried out.

(1) Dielectric Characteristics

The pellet of the resin composition for high dielectric constant materials (C) was put into an injection molding machine (manufactured by Toshiba Machine Co., Ltd., IS100F, mold clamping force: 100 t), and a plate-shaped molded article (100 mm×100 mm×thickness: 3 mm) was produced at a cylinder temperature of 290 to 310° C. and at a mold temperature of 100° C. The dielectric constant and dielectric loss tangent thereof were measured at room temperature and at 1 GHz using a material analyzer (manufactured by Agilent Co., Ltd., 4291A). The dielectric constant was 9.4 and the dielectric loss tangent was 0.0081.

(2) Outer Appearance

The pellet of the resin composition for high dielectric constant materials (C) was put into an injection molding machine (manufactured by Toshiba Machine Co., Ltd., IS100F, mold clamping force: 100 t), and a plate-shaped molded article (100 mm×100 mm×thickness: 3 mm) was produced at a cylinder temperature of 290 to 310° C. and at a mold temperature of 100° C. Evaluation of outer appearance regarding a flow mark generated on the obtained molded article was carried out by visual observation. The outer appearance was evaluated on a scale of 1 to 5 (5: very good, 4: good, 3: slightly good, 2: slightly poor, 1: poor). It was evaluated as 5.

Examples B1 to B4 and Comparative Example B1

Using a polycarbonate resin (S3000-FN) as the primary material, squire plates (100×100 mm) respectively having thicknesses of 1 mmt, 1.5 mmt and 2 mmt were produced by injection molding. Using the same polycarbonate resin, a sheet having a thickness of 1 mmt was produced by extrusion molding, and it was cut to a piece (100×100 mm). Each of these primary materials with 4 different thicknesses was inserted into a mold with a cavity having a length of 100 mm, a width of 100 mm and a thickness of 3 mmt. Using the above-described resin composition for high dielectric constant materials (C) as the secondary material, a two-color molded article having a thickness of 3 mmt was obtained by injection molding (Examples B1 to B4). Further, in the same mold, the resin composition for high dielectric constant materials (C) was injection-molded without inserting the primary material therein, thereby obtaining a molded article having a thickness of 3 mmt (Comparative Example B1). The respective molded articles were evaluated by the below-described falling ball impact test.

(3) Falling Ball Impact Test

The test was carried out based on JIS K7211. In the test, the surface of the side of the resin composition for high dielectric constant materials (C) of the two-color molded article was the surface against which the iron ball hit. The 50% impact fracture energy E50 was calculated using the staircase method, and impact characteristics of the two-color molded article were evaluated. The results are shown in Table 3.

2001, and the DBP absorption is represented by the volume of DBP (dibutyl phthalate) absorbed per 100 g (mL/100 g) and is commonly used as an index of characteristics of carbon black.

In general, carbon black exists in a state called "aggregate" in which particles are bonded by fusion, and it is conceptually compared to a bunch of grapes. The degree of development of this aggregate is called "structure", and the DBP absorption is used as an index representing the degree of structure development. When the DBP absorption of the carbon black is more than 50 mL/100 g, it is difficult to disperse carbon black particles at high concentrations. Further, in the case of a carbon black having a DBP absorption of less than 10 mL/100 g, adhesion of carbon black particles to a production apparatus is increased at the time of the production of the carbon black, resulting in difficulty in continuous operation (Japanese Laid-Open Patent Publication No. 2011-98995).

The type of the carbon black (E) to be used in the present invention is not limited as long as it has a specific DBP absorption, and it can be suitably selected depending on purposes. Examples thereof include oil furnace black, which is produced by subjecting raw oil to incomplete combustion

TABLE 3

|  | Comparative Example B1 | Example B1 | Example B2 | Example B3 | Example B4 |
|---|---|---|---|---|---|
| Thickness of primary material (PC) (mm) | 0 | 0.5 | 1.0 | 1.5 | 2.0 |
| Thickness of secondary material (resin composition for high dielectric constant materials) (mm) | 3.0 | 2.5 | 2.0 | 1.5 | 1.0 |
| Falling ball impact strength E50 (mJ) | 150 | 1050 | 1500 | 3350 | 8600 |

According to the table, it is understood that the molded articles of the resin for high dielectric constant materials of Examples B1 to B4 not only have excellent dielectric characteristics, but also can be easily produced and have excellent outer appearance and impact resistance. Meanwhile, the molded article of Comparative Example B1, which is not a two-color molded article, has excellent dielectric characteristics, but has very low impact characteristics, and it cannot be said that it has characteristics sufficient to be used for mobile phone devices, etc.

The molded article of the above-described second embodiment has excellent dielectric characteristics and is particularly suitable as a high dielectric constant material to be used in an antenna member requiring a high dielectric constant and a low dielectric loss tangent. In addition, since it is possible to perform two-color molding with a polycarbonate having excellent impact characteristics, impact characteristics are improved in the obtained molded article compared to the case in which only the resin composition for high dielectric constant materials is used.

Third Embodiment

The master batch for coloring related to the third embodiment of the present invention contains a carbon black (E) having specific physical properties and a resin material (F). The carbon black (E) is characterized in that it has a low DBP absorption.

Carbon Black (E)

The carbon black to be used in the present invention has a DBP absorption of 10 to 50 mL/100 g, and preferably has a DBP absorption of 25 to 35 mL/100 g. The method for measuring a DBP absorption is described in JIS K6217-4:

according to the oil furnace method, Ketjen black, which is produced according to the special furnace method, acetylene black, which is produced using acetylene gas as a raw material, lamp black, which is produced by direct combustion of a raw material in a closed space, thermal black, which is produced by thermal decomposition of natural gas, and channel black, which is obtained by contacting the bottom surface of a channel steel with diffusion flame. As commercially-available products, "Asahi #8" and "Asahi Thermal" (Asahi Carbon Co., Ltd.) produced according to the furnace black method are mentioned.

The iodine adsorption is used as another index of characteristics of carbon black. The method for measuring an iodine adsorption is described in JIS K6217-1: 2008, and the iodine adsorption is represented by the amount of iodine adsorbed per unit weight of the carbon black (mg/g). The iodine adsorption is the most representative index showing the total specific surface area of the carbon black particle including pores thereof, and correlates with the DBP absorption to some extent. The carbon black (E) to be used in the present invention preferably has an iodine adsorption of 10 to 30 mg/g.

Usually, for carbon black widely used for the purpose of imparting conductive properties to a resin composition, those having a large DBP absorption and a large iodine adsorption are preferred. Meanwhile, the carbon black to be used in the present invention is characterized in that the DBP absorption thereof is limited to the range of low levels.

Regarding the surface pH of the carbon black, those showing to be moderately alkaline and those showing to be neutral to acidic exist. When using a polycarbonate or polyester as the resin material (F), these resins tend to be hydrolyzed by an alkali. Accordingly, for the carbon black (E), those showing to be neutral to acidic are suitable, and the surface pH is preferably 3 to 8.

Resin Material (F)

The resin material of the present invention is desirably a thermoplastic resin. Examples thereof include polyolefin-based resins such as a low density polyethylene, a very low density polyethylene, an ultra low density polyethylene, a high density polyethylene, a low molecular weight polyethylene, an ultra high molecular weight polyethylene, an ethylene-propylene copolymer and polypropylene, styrene-based resins such as a polystyrene, an impact-resistant polystyrene, an acrylonitrile-styrene copolymer (AS resin) and an acrylonitrile-butadiene-styrene copolymer (ABS resin), modified polyphenylene ether resins such as an alloy of polyphenylene ether resin and polystyrene-based resin, an alloy of polyphenylene ether resin and polyamide-based resin and an alloy of polyphenylene ether resin and polyolefin-based resin, and a polycarbonate resin. In addition, engineering plastics such as polyester resins typified by polybutyrene terephthalate resin, polyethylene terephthalate resin, etc., polyamide resins typified by polyamide 6, polyamide 66, polyamide MXD6, etc., and polyacetal resins, and alloys containing such a resin are also mentioned. If desired, highly heat-resistant super engineering plastics such as liquid crystal polymers, polyphenylene sulfide resins and polyimide resins and alloys containing such a substance can also be used.

Usually, as a resin material as the base resin for a master batch, only resins such as polystyrene and AS resin can be used as described below. Meanwhile, in the case of the master batch for coloring of the present invention, the resin material can be used substantially without limitation by combination with the specific carbon black (E). Among the above-described examples, preferred are a polycarbonate resin, a polystyrene-based resin, a polyamide-based resin, a polyester-based resin and a polyacetal-based resin. Particularly preferred is a polycarbonate resin on the point that a carbon black can be added thereto at a higher concentration.

The carbon black has high cohesive properties, and a secondary aggregate (agglomerate) is easily formed from aggregates by the Van der Waals force, just gathering, adhesion, entanglement or the like. Even when the carbon black is blended in a resin, the aggregation structure is maintained, and it is considered that this causes "grain" of molded articles. In the case of a master batch containing a high concentration of the carbon black (E), the viscosity thereof is significantly increased compared to the resin material (F) as the base resin, and therefore, it is difficult to provide strong kneading for breaking the aggregation structure. For this reason, low-viscosity materials such as polystyrene, AS resin and an oligomer have been used as the resin material (F). However, when engineering plastics is colored by utilizing such a master batch, since the resin material (F) has a low viscosity or is a type different from that of the resin to be colored, mechanical properties, etc. of a resin composition after mixing may be reduced. Accordingly, it is desired that the resin material (F) is the same type as the resin to be colored and has a molecular weight comparable to that of the resin to be colored.

The melt viscosity of the resin material (F) to be used in the present invention is not particularly limited, and is preferably 100 to 2000 Pa·s (280° C., 100/sec).

In the master batch for coloring of the present invention, the contents of the carbon black (E) and the resin material (F) are not particularly limited, but usually, the content of the carbon black (E) is 10 to 90% by mass and the content of the resin material (F) is 10 to 90% by mass. In the carbon master batch for coloring, the carbon black can be contained at a high concentration, and it is required that the carbon black particles can exist in a dispersed state without aggregation.

According to JIS K6217-4: 2008, the smallest structural unit of the carbon black is a primary aggregate (aggregate) in which fine particles adhere to each other. It can be said that the more the number of fine particles per one aggregate is, the more the structure is developed. Since the aggregate has a complicated structure due to branching, it has a void portion, and the more the structure of the carbon black is developed, the larger the volume of the void portion is. Since DBP oil is taken into a void existing in the aggregate, the DBP absorption of the carbon black is the amount of DBP required for filling the void of the aggregate. Accordingly, it is explained that the DBP absorption is used in a method for evaluating the degree of structure development of the carbon black. Specifically, when DBP oil in an amount which is equal to or less than the DBP absorption is mixed with the carbon black, the whole added DBP oil is absorbed in the void, and therefore the carbon black is dry and not mixed well. That is, particles agglutinate and the dispersion state is not good. When DBP oil in an amount which is more than the DBP absorption is added to the carbon black, the void is filled with DBP oil and excess DBP oil exists between aggregates, and therefore a good dispersion state can be obtained. The same applies to the case of dispersion in a resin, and the lower the DBP absorption of the carbon black is, the better the dispersion state is, and a large amount of the carbon black can be added to the resin. The higher the concentration in the master batch is, the more the ratio of the resin material (F) contained in the master batch can be reduced, and characteristics of the resin to be colored are not affected by the master batch, and therefore it is desirable.

The carbon black (E) having a specific DBP absorption to be used in the master batch for coloring of the present invention can be blended in a resin at a high concentration. Therefore, the content of the carbon black (E) in the master batch for coloring of the present invention is preferably 40 to 90% by mass, and more preferably 60 to 90% by mass. In this case, the content of the resin material (F) in the master batch for coloring is preferably 10 to 60% by mass, and more preferably 10 to 40% by mass.

It is possible to blend a thermal stabilizer in the master batch for coloring of the present invention in order to improve thermal stability in a high temperature atmosphere at the time of melting and kneading in the production of the resin composition and the molding process and at the time of use of a product. As the thermal stabilizer, a hindered phenol-based compound, a phosphite-based compound, a phosphonate-based compound, zinc oxide, etc. are preferred.

It is also possible to blend a publicly-known ultraviolet absorber added to resin compositions, and other additives such as a pigment, an antistatic agent, a flame retardant, a mold release agent and an elastomer for impact modification according to need.

The master batch for coloring of the present invention contains the specific carbon black (E) and the resin material (F), and it is produced, for example, by undergoing a process of melting and kneading the specific carbon black (E) and the resin material (F).

The carbon black (E) to be used in the present application has a DBP absorption of 10 to 50 mL/100 g, and shows better dispersibility in melted resin compared to usual carbon blacks having a DBP absorption exceeding the upper limit of the above-described numerical range. Therefore, it is suitable for the production by melting and kneading using an extruder.

Melting and kneading can be carried out, for example, by blending the carbon black (E), and according to need, the thermal stabilizer or additives as described above in the resin material (F), homogeneously mixing them using a Henschel mixer, a ribbon blender, a V-type blender or the like, and then heating and kneading the mixture in a melt state using a single-screw or multi-screw kneading extruder, a roll, a Banbury mixer, a Labo Plastomill (Brabender), a pressure type kneader or the like. Instead of mixing and kneading all components at a time, several components can be mixed in advance or supplied in the middle of kneading without mixing in advance.

Regarding the kneading temperature and the kneading time, usually, the kneading temperature is 200 to 350° C., and preferably 220 to 320° C., and the kneading time is preferably 20 minutes or less. When the temperature is higher than 350° C. or the time is more than 20 minutes, heat deterioration of the resin material is caused, and it may result in reduction in physical properties of a molded article or poor outer appearance of the article.

The obtained pellet-type master batch may be directly subjected to melting and kneading with a resin to be colored to produce a colored molding material, but it may also be used after formed into coarse particles by a crusher or the like depending on characteristics of the resin to be colored. A master batch in a massive form obtained by utilizing a Banbury mixer, a pressure type kneader or the like may also be used after formed into coarse particles having an appropriate size by a crusher or the like depending on characteristics of the resin to be colored.

As the resin to be colored, which is a target for coloring with use of the above-described master batch, the same resins as those for the resin material (F) explained above as the base resin of the master batch can be used. As described above, the resin to be colored is preferably the same as the resin material in the master batch.

According to one embodiment of the present invention, a molding material comprising the above-described master batch for coloring and resin to be colored is provided. Using this molding material, molded articles suitable for intended use can be produced.

Example C

The above-described third embodiment will be described in more detail based on working examples, but the present invention is not limited thereto. The below-described materials were used as the respective components in the working examples and comparative examples.

(E) Carbon Black
(e1) Manufactured by Asahi Carbon Co., Ltd., "trade name: Asahi #8", DBP absorption: 30 mL/100 g, pH=7.5, iodine adsorption: 12 mg/g
(e2) Manufactured by Mitsubishi Chemical Corporation, "trade name: MA600", DBP absorption: 115 mL/100 g, pH=7, iodine adsorption: 40 mg/g
(F) Resin Material
(f1) Polycarbonate Resin
Manufactured by Mitsubishi Engineering-Plastics Corporation, "trade name: H-4000FN", viscosity-average molecular weight: 16000, melt viscosity: 250 Pa·s (280° C., 100/sec)
(f2) Polycarbonate Resin
Manufactured by Mitsubishi Engineering-Plastics Corporation, "trade name: S-3000FN", viscosity-average molecular weight: 22000, melt viscosity: 850 Pa·s (280° C., 100/sec)
(f3) Aromatic Polyamide Resin
Manufactured by Mitsubishi Engineering-Plastics Corporation, "trade name: Reny 6001", viscosity-average molecular weight: 17000, melt viscosity: 100 Pa·s (280° C., 100/sec)
(G) Thermal Stabilizer
(g1) Phosphite-based antioxidant; manufactured by Adeka Argus Co., Ltd., "trade name: ADEKA STAB 2112"
(g2) Hindered phenol-based antioxidant; manufactured by BASF Japan Ltd., "trade name: Irganox 1098"
(H) Resin to be Colored
(h1) Polycarbonate Resin
Manufactured by Mitsubishi Engineering-Plastics Corporation, "trade name: S-3000FN", viscosity-average molecular weight: 22000
(h2) Glass Fiber Reinforced Aromatic Polyamide Resin
Manufactured by Mitsubishi Engineering-Plastics Corporation, "trade name: Reny 1002H" (product in which glass fiber is blended in Reny 6001 in an amount of 30%)

Examples C1 to C7 and Comparative Examples C1 to C3

The carbon black, polycarbonate resin, polyamide resin and thermal stabilizer were blended together at the ratio described in Table 4, and the mixture was mixed homogeneously using a tumbler mixer. This was put into the uppermost upstream part of a twin screw extruder (manufactured by The Japan Steel Works, Ltd., "TEX30α", screw diameter: 30 mm, L/D=63) and melt-kneaded, thereby producing a master batch for coloring. The conditions for extrusion and kneading are as follows: (Examples C1 to C6): cylinder temperature: 265° C., screw rotation speed: 400 rpm, discharge rate: 20 Kg/h
(Example C7): cylinder temperature: 270° C., screw rotation speed: 300 rpm, discharge rate: 20 Kg/h
(Comparative Example C2) Since discharge was not stable, the cylinder temperature, screw rotation speed and discharge rate were respectively changed to 260° C., 300 rpm and 2 Kg/h to carry out the production.
(Comparative Examples C1 and C3) Since the carbon spouted from a vacuum vent, it was impossible to produce a master batch.

The master batch for coloring was evaluated with respect to easiness of production at the time of extrusion and kneading.
(1) Easiness of the Production of Master Batch
Easiness of the production of master batch was evaluated based on the state of a twin screw extruder at the time of mixing the carbon black (E) and the resin material (F) together and melting and kneading the mixture using the extruder according to the below-described criteria. The results are shown in Table 4.
(Easy) The value of the motor current is constant, the discharge rate does not vary, and cutting of a strand does not occur. Volatilization from a vacuum vent is slightly caused, but almost no gum is generated at a discharge port, and cutting of a strand does not occur. There is almost no need of maintenance, and the production can be carried out stably.
(Difficult) Discharge is unstable, cutting of a strand frequently occurs, and it is difficult to carry out the production continuously. Alternatively, a large amount of gum is accumulated at a discharge port, and frequent maintenance is required. It is possible to carry out the production intermittently or to produce a small amount of the master batch with the discharge rate being reduced.
(Impossible) The carbon black (E) and the resin material (F) are not melt-kneaded in the inside of an extruder, and the carbon black spouts from a vacuum vent. Even a small amount of the master batch cannot be produced.

S-3000FN, evaluation of (3) Impact resistance based on the Charpy impact strength was carried out. The results are shown in Table 5.

(2) Outer Appearance of Molded Article

The colored pellet was dried at 100° C. for 4 hours. After that, a plate-shaped molded article (100 mm×100 mm×thickness: 3 mm) was produced with an injection

TABLE 4

| Production of master batch for coloring | | Example C1 | Example C2 | Example C3 | Example C4 | Example C5 | Example C6 | Example C7 | Comparative Example C1 | Comparative Example C2 | Comparative Example C3 |
|---|---|---|---|---|---|---|---|---|---|---|---|
| (E) Carbon black | e1 | 40 | 50 | 70 | 40 | 50 | 70 | 40 | | | |
| | e2 | | | | | | | | 50 | 50 | 70 |
| (F) Resin material | f1 | | | | 60 | 50 | 30 | | | 50 | 30 |
| | f2 | 60 | 50 | 30 | | | | | 50 | | |
| | f3 | | | | | | | 60 | | | |
| (G) Thermal stabilizer | g1 | 0.05 | 0.05 | 0.05 | 0.05 | 0.05 | 0.05 | | 0.05 | 0.05 | 0.05 |
| | g2 | | | | | | | 0.05 | | | |
| Easiness of production | | Easy Stable at discharge rate of 20 Kg/h | Easy Stable at discharge rate of 20 Kg/h | Easy Stable at discharge rate of 20 Kg/h | Easy Stable at discharge rate of 20 Kg/h | Easy Stable at discharge rate of 20 Kg/h | Easy Stable at discharge rate of 20 Kg/h | Easy Stable at discharge rate of 20 Kg/h | Impossible Carbon spouted from vacuum vent of extruder | Difficult Discharge was unstable and production was carried out at discharge rate of 2 Kg/h | Impossible Carbon spouted from vacuum vent of extruder |
| Master batch No. | | M1 | M2 | M3 | M4 | M5 | M6 | M7 | — | M8 | — |

Unit of blending amount: % by mass
e1: Carbon black Asahi #8
e2: Carbon black MA600
f1: Polycarbonate H-4000FN
f2: Polycarbonate S-3000FN
f3: Reny 6001
g1: ADEKA STAB 2112
g2: Irganox 1098

Examples C1 to C7: (Easy) Good extrusion characteristics were obtained, and the master batch was successfully produced stably at a discharge rate of 20 Kg/h.
Comparative Example C2: (Difficult) At a discharge rate of 20 Kg/h, kneading of the carbon black and resin was not stable and a resin strand was cut frequently. For this reason, the discharge rate was reduced to 2 Kg/h to produce the master batch.
Comparative Examples C1 and C3: (Impossible) The carbon spouted from a vacuum vent of an extruder. Even when the extrusion conditions were changed, it was impossible to perform continuous discharge of a strand.

Examples C8 to C14 and Comparative Example C4

Each of the maser batches M1 to M7 obtained in Examples C1 to C7 and the master batch M8 obtained in Comparative Example C2 and a resin to be colored were melt-kneaded using an extruder to produce a molding material in which the blending amount of the carbon black was 1.0% by mass. The molding material was obtained as a colored pellet using a twin screw extruder (manufactured by The Japan Steel Works, Ltd., "TEX30α", screw diameter: 30 mm, L/D=63) at a cylinder temperature of 265° C., at a screw rotation speed of 400 rpm and at a discharge rate of 20 Kg/h. The obtained colored pellet was injection-molded and evaluated with respect to (2) Outer appearance of molded article. The results are shown in Table 5. Further, regarding Examples C8 to C13 and Comparative Example C4 in which the resin to be colored is the polycarbonate molding machine (manufactured by Toshiba Machine Co., Ltd., IS100F, mold clamping force: 100 t) at a cylinder temperature of 290 to 310° C. and at a mold temperature of 100° C. Evaluation of outer appearance regarding "grain" generated on the obtained molded article was carried out by visual observation.

In the evaluation of outer appearance, light was shed on the surface of the molded article obliquely, and the degree of notisable agglomerated particles of the carbon black was judged. The outer appearance was evaluated by visual observation on a scale of 1 to 5 (5: very good, 4: good, 3: slightly good, 2: slightly poor, 1: poor).

(3) Impact Resistance (Charpy Impact Strength)

Evaluation was carried out in conformity with ISO 179-1 and 179-2. The colored pellet obtained by the above-described method was dried at 100° C. for 4 hours. After that, a test piece (10 mm×80 mm×thickness: 4 mm) was produced with an injection molding machine (manufactured by Toshiba Machine Co., Ltd., IS100F, mold clamping force: 100 t) at a cylinder temperature of 290 to 310° C. and at a mold temperature of 100° C. The test piece was subjected to notching, and the Charpy impact strength thereof (kJ/m$^2$) was measured at 23° C.

TABLE 5

| Production of colored pellet | Master batch No. | Master batch Blending amount (% by mass) | Resin to be colored Type | Resin to be colored Blending amount (% by mass) | Outer appearance of injection-molded article | Charpy impact strength (kJ/m$^2$) |
|---|---|---|---|---|---|---|
| Example C8 | M1 | 2.5 | h1 | 97.5 | 5 | 60 |
| Example C9 | M2 | 2 | h1 | 98 | 5 | 58 |
| Example C10 | M3 | 1.4 | h1 | 98.6 | 5 | 59 |
| Example C11 | M4 | 2.5 | h1 | 97.5 | 5 | 35 |
| Example C12 | M5 | 2 | h1 | 98 | 5 | 39 |
| Example C13 | M6 | 1.4 | h1 | 98.6 | 5 | 55 |
| Example C14 | M7 | 2.5 | h2 | 97.5 | 5 | — |
| Comparative Example C4 | M8 | 2 | h1 | 98 | 2 | 36 | h1: Polycarbonate S3000FN
h2: Reny 1002H (Regarding Outer Appearance of Molded Article)

Examples C8 to C14: The surface state of the molded article was observed, and no grain was seen.

Comparative Example C4: On the surface of the molded article, many grains that were agglomerated carbon black particles were seen.

(Regarding Impact Strength)

Molded articles after the Charpy impact strength test are classified into ductile fracture (a sample after the test broken in a state where parts of the sample are not separated but connected partially) and brittle fracture (a sample after the test broken in a state where parts of the sample are completely separated). In Examples C8 to C10 and C13, all 5 pieces tested were classified into ductile fracture, but in Examples C11 and C12 and Comparative Example C4, one out of 5 pieces tested was classified into brittle fracture.

The master batch for coloring of the above-described third embodiment can be easily mass-produced, and a large amount of the carbon black can be blended therein. Further, in a molding material obtained by mixing the master batch for coloring with the resin to be colored, the carbon black can be dispersed homogeneously. Accordingly, poor outer appearance such as "grain" is not easily generated on a molded article obtained from the molding material. In addition, the molded article obtained by mixing the master batch for coloring with the resin to be colored has good impact strength.

The invention claimed is:

1. A resin composition for high dielectric constant materials, which consists of 40 to 80% by mass of a resin material (A) selected from the group consisting of polycarbonate and modified polyphenylene ether resins, 20 to 60% by mass of a carbon material that consists of carbon black (B), wherein the carbon black (B) has a DBP absorption of 30 to 50 mL/100 g and an iodine adsorption of 5 to 12 mg/g, and optionally one or more additives selected from the group consisting of a foaming agent, a lubricant, a flowability improvement agent, a dye, and a dispersant, wherein the resin composition for high dielectric constant materials has a dielectric constant of 4 or more and a dielectric loss tangent of 0.05 or less.

2. The resin composition for high dielectric constant materials according to claim 1, which consists of 50 to 60% by mass of the resin material (A) and 40 to 50% by mass of the carbon black (B), wherein the carbon black (B) has a DBP absorption of 30 to 35 mL/100 g.

3. The resin composition for high dielectric constant materials according to claim 1, wherein the carbon black (B) has a nitrogen adsorption specific surface area of 5 to 40 m$^2$/g.

4. The resin composition for high dielectric constant materials according to claim 1, wherein the carbon black (B) has a ratio of a value of the nitrogen adsorption specific surface area (m$^2$/g) to a value of the iodine adsorption (mg/g) of less than 1.3.

5. The resin composition for high dielectric constant materials according to claim 1, wherein the resin material (A) is a modified polyphenylene ether resin comprising an alloy of polyphenylene ether resin and polystyrene-based resin.

6. The resin composition for high dielectric constant materials according to claim 1, wherein the resin material (A) is a polycarbonate resin.

7. A molded article containing the resin composition for high dielectric constant materials according to claim 1.

8. A molded article obtained by two-color molding of the resin composition for high dielectric constant materials (C) according to claim 6 and a polycarbonate resin (D).

9. The molded article according to claim 8, which consists of a layer of the resin composition for high dielectric constant materials (C) and a layer of the polycarbonate resin (D), wherein the thickness of the layer of the polycarbonate resin (D) is 0.1 to 5 mm.

10. The resin composition for high dielectric constant materials according to claim 1, wherein the carbon black (B) has a DBP absorption of 30 or more to less than 40 mL/100 g.

11. A resin composition for high dielectric constant materials, which consists of 40 to 80% by mass of a resin material (A) selected from the group consisting of polycarbonate and an alloy of polyphenylene ether resin/high impact polystyrene resin, 20 to 60% by mass of a carbon black (B), wherein the carbon black (B) has a DBP absorption of 30 to 50 mL/100 g and an iodine adsorption of 7 to 12 mg/g, and optionally one or more additives selected from the group consisting of a foaming agent, a lubricant, a flowability improvement agent, a dye, and a dispersant, wherein the resin composition for high dielectric constant materials has a dielectric constant of 4 or more and a dielectric loss tangent of 0.05 or less.

* * * * *